(12) United States Patent
Miu et al.

(10) Patent No.: US 12,411,271 B2
(45) Date of Patent: Sep. 9, 2025

(54) COMPOSITE QUANTUM DOT OPTICAL FILM COMPRISING FIRST AND SECOND OPTICAL PRISM FILMS

(71) Applicant: UBRIGHT OPTRONICS CORPORATION, Taoyuan (TW)

(72) Inventors: Chia-Yeh Miu, Taoyuan (TW); Yu-Mei Juan, Taoyuan (TW); Chia-Jung Chiang, Taoyuan (TW); Ge-Wei Lin, Taoyuan (TW); Ying-Yi Lu, Taoyuan (TW); Hui-Yong Chen, Taoyuan (TW); Lung-Pin Hsin, Taoyuan (TW); Jeffrey Wu, Taoyuan (TW)

(73) Assignee: UBRIGHT OPTRONICS CORPORATION, Taoyuan County (TW)

( * ) Notice: Subject to any disclaimer, the term of this patent is extended or adjusted under 35 U.S.C. 154(b) by 955 days.

(21) Appl. No.: 17/536,131

(22) Filed: Nov. 29, 2021

(65) Prior Publication Data
US 2023/0043944 A1    Feb. 9, 2023

Related U.S. Application Data

(60) Provisional application No. 63/230,835, filed on Aug. 9, 2021.

(51) Int. Cl.
| | |
|---|---|
| G02B 5/04 | (2006.01) |
| B32B 3/30 | (2006.01) |
| B32B 7/12 | (2006.01) |
| B32B 27/08 | (2006.01) |
| B32B 27/36 | (2006.01) |
| G02B 5/02 | (2006.01) |

(52) U.S. Cl.
CPC ............... *G02B 5/045* (2013.01); *B32B 3/30* (2013.01); *B32B 7/12* (2013.01); *B32B 27/08* (2013.01); *B32B 27/36* (2013.01); *G02B 5/0242* (2013.01); *B32B 2255/10* (2013.01); *B32B 2260/046* (2013.01); *B32B 2305/30* (2013.01); *B32B 2307/406* (2013.01); *B32B 2307/7244* (2013.01); *B32B 2307/7265* (2013.01); *B32B 2307/732* (2013.01); *B32B 2457/202* (2013.01); *B32B 2551/00* (2013.01)

(58) Field of Classification Search
CPC .......................... B32B 2305/30; G02B 6/004
See application file for complete search history.

(56) References Cited

U.S. PATENT DOCUMENTS

| | | | | |
|---|---|---|---|---|
| 2016/0116663 | A1* | 4/2016 | Hong | G02B 6/0053 362/330 |
| 2018/0267365 | A1* | 9/2018 | Eckert | G02B 6/00 |
| 2019/0384119 | A1* | 12/2019 | Hai | G02B 5/3033 |
| 2020/0292881 | A1* | 9/2020 | Tsai | G02F 1/133611 |

FOREIGN PATENT DOCUMENTS

| | | | | |
|---|---|---|---|---|
| CN | 103487857 A | * | 1/2014 | |
| KR | 20160089686 A | * | 7/2016 | ....... G02F 1/133602 |

* cited by examiner

*Primary Examiner* — Paul C Lee
(74) *Attorney, Agent, or Firm* — Min-Lee Teng (57) ABSTRACT

The present invention discloses a quantum-dot composite film comprising: a quantum-dot prism film, comprising a quantum-dot layer and a first plurality of prisms disposed over the quantum-dot layer, wherein a first optical prism film and a second optical prism film are disposed over the quantum-dot prism film for increasing the brightness level of the quantum-dot prism film.

15 Claims, 10 Drawing Sheets

| QD film A4 size | Structure | Blue Intensity | Green Intensity | Green λ nm | Red Intensity | Red λ nm | Lum. | Lum. vs QDEF |
|---|---|---|---|---|---|---|---|---|
| QDEF0912 (Conventional) | QD film | 100.0% | 100.0% | 528 | 100.0% | 627 | 1533.9 | 100.0% |
| Q42A (case 1) | QD film | 94.9% | 105.0% | 534 | 106.6% | 635 | 1596.1 | 104.1% |
| Q42A (case 2) | QD film/AD/POP | 109.9% | 290.2% | 534 | 352.4% | 635 | 4102.9 | 267.5% |
| Q42C (case 3) | QD film with prism | 91.5% | 113.5% | 534 | 114.0% | 635 | 1693.7 | 110.4% |
| Q42C (case 4) | QD film with prism/AD/POP | 100.5% | 319.9% | 534 | 404.9% | 635 | 4494.2 | 293.0% |

FIG. 8

COMPOSITE QUANTUM DOT OPTICAL FILM COMPRISING FIRST AND SECOND OPTICAL PRISM FILMS

CROSS-REFERENCE TO RELATED APPLICATION

This application claims the benefit of U.S. provisional patent application No. 63/230,835, filed on Aug. 9, 2021, which is hereby incorporated herein by reference.

BACKGROUND OF THE INVENTION

1. Field of the Invention

The present invention relates to a quantum-dot film, and more particularly to a quantum-dot composite film.

2. Description of Related Art

The quantum dot is a semiconductor particle having a nanometer size and a spherical shape. The colored spectrum can be generated when the quantum dots are excited by light or electricity. The color of the excited light is determined according to the material and the size of the quantum dot. Because quantum dots can change the color of the light emitted by a light source, they can be widely used in display devices, such as liquid crystal displays (LCD). The quantum dots can enhance the color gamut, the color and the brightness of the display device such that the display device can have a color gamut of about 110% NTSC (National Television System Committee).

The quantum dot is commonly made of IV, II-VI, IV-VI or III-V elements, such as Si, Ge, CdS, CdSe, CdTe, ZnSe, PbS, PbSe, InP and InAs, where the most widely used are mainly CdSe and InP. QD Vision mainly uses CdSe as the material of the quantum dot, Nanoco mainly uses InP as the material of the quantum dot and Nanosys uses a combination of CdSe and InP as the material of the quantum dot. There are advantages and disadvantages for each of the CdSe quantum dot and the InP quantum dot. The CdSe quantum dot has a high luminance efficiency and has better color gamut performance, but it contains a heavy metal, such as Cd. The InP quantum dot doesn't have Cd, so it isn't limited by the criterion of RoHS (Restriction of Hazardous Substances) set up by the EU (European Union).

The features of the quantum dots used in display devices include: (1) high color pureness and the peak shown in the spectrum is narrower and symmetrically distributed; (2) controlling the size and the material of the quantum dot can change the wavelength of the emission light to further adjust the color of the light, which can be shown in the emission spectrum; (3) better performance in the color with color gamut greater than 110% NTSC; (4) quantum efficiency of at least 90%, so light stability is good; (5) potentially achieving pixels of a nanometer-class, and as such, quantum dots can be used for manufacturing a screen of the highest resolution.

Currently, quantum-dot televisions sold in the market use quantum-dot liquid crystal displays (QD LCD). There are two main backlight sources used in the quantum-dot liquid crystal display (QD LCD): the tubal quantum-dot backlight and the thin-film quantum-dot backlight. The tubal quantum-dot backlight is mainly produced by QD Vision in America and called Color IQ optical device. The thin-film quantum-dot backlight is mainly produced jointly by Nanosys and 3M and called QDEF thin-film.

Because the blue light can be transformed into three colored lights (RGB), the pureness of three colored lights (RGB) of the quantum-dot backlight is higher than that of the LED (Light-emitting diode) backlight. By controlling the material and the size of the quantum dot, a truer and more uniform color performance can be obtained.

Accordingly, the present invention proposes a new solution to overcome the above-mentioned disadvantages.

SUMMARY OF THE INVENTION

The quantum-dot layer of the quantum-dot film comprises a binder and a plurality of quantum dots dispersed in the binder. The quantum dots are capable of being water-resistant and oxygen-resistant enough without a barrier layer formed over/on each of the first major surface and the second major surface of the quantum-dot layer. The total thickness of the quantum-dot film having no barrier layer in the present invention can be less than the total thickness of the quantum-dot film having a barrier layer in the prior art; therefore, the present invention can decrease the total thickness of the quantum-dot film. In addition, because there is no barrier layer, not only is the manufacturing complexity of the quantum-dot film simplified, but the total manufacturing cost of the quantum-dot film is also reduced.

One objective of the present invention is to emboss an optical brightness enhancement layer on an optical film comprising a plurality of quantum dots to form a quantum-dot composite film.

One objective of the present invention is to emboss an optical brightness enhancement layer on an optical film comprising a plurality of quantum dots to form a quantum-dot composite film, wherein the plurality of quantum dots are capable of being water-resistant and oxygen-resistant.

One objective of the present invention is to emboss a plurality of prisms on an optical film comprising a plurality of quantum dots to form a quantum-dot composite film.

One objective of the present invention is to emboss a plurality of prisms on an optical film comprising a plurality of quantum dots to form a quantum-dot composite film, wherein the plurality of quantum dots are capable of being water-resistant and oxygen-resistant.

One objective of the present invention is to provide a quantum-dot composite film with the brightness being at least twice the brightness of a single quantum dot film.

In one embodiment, the present invention discloses a quantum-dot composite film comprising: a quantum-dot layer comprising a binder and a plurality of quantum dots dispersed in the binder; a first barrier layer, disposed over the quantum-dot layer; and a plurality of prisms, disposed over the first barrier layer.

In one embodiment, the present invention discloses a quantum-dot composite film comprising: a quantum-dot layer comprising a binder and a plurality of quantum dots dispersed in the binder; and a plurality of prisms, disposed over the quantum-dot layer.

In one embodiment, the plurality of prisms comprises a photo-curable material.

In one embodiment, the plurality of prisms comprises a thermally-curable material.

In one embodiment, the quantum-dot layer further comprises a plurality of diffusing particles.

In one embodiment, a quantum dot comprises Cd.

In one embodiment, wherein the concentration of the quantum dots in the quantum-dot layer is 0.05-20%.

In one embodiment, wherein the concentration of the quantum dots in the quantum-dot layer is 0.05-8%.

In one embodiment, the binder comprises at least one of the following: PET (polyethylene terephthalate), PEN (polyethylene naphtholate), PAR (polyacrylate), PC (polycarbonates) and TAC (cellulose triacetate).

In one embodiment, the plurality of prisms that are embossed on the quantum-dot layer.

In one embodiment, an adhesive layer is disposed on the quantum-dot layer, the plurality of prisms that are adhered to the adhesive layer.

In one embodiment, the present invention discloses a quantum-dot composite film comprising: a plurality of quantum dots disposed therein, wherein the plurality of quantum dots are capable of being water-resistant and oxygen-resistant; and a plurality of prisms, disposed over the quantum-dot layer.

In one embodiment, the plurality of prisms comprises a photo-curable material.

In one embodiment, the plurality of prisms comprises a thermally-curable material.

In one embodiment, the quantum-dot layer further comprises a plurality of diffusing particles.

In one embodiment, a quantum dot comprises Cd.

In one embodiment, wherein the concentration of the quantum dots in the quantum-dot layer is 0.05-20%.

In one embodiment, wherein the concentration of the quantum dots in the quantum-dot layer is 0.05-8%.

In one embodiment, the present invention discloses a quantum-dot composite film comprising: a plurality of quantum dots dispersed therein, wherein the plurality of quantum dots are capable of being water-resistant and oxygen-resistant; and an optical brightness enhancement layer, disposed over the quantum-dot layer.

In one embodiment, the present invention discloses a method for forming a quantum-dot film, comprising: performing a process on a plurality of quantum dots for enabling the plurality of quantum dots to be water-resistant and oxygen-resistant; forming a quantum-dot layer comprising a binder and the plurality of quantum dots dispersed in the binder, wherein the plurality of quantum dots are capable of being water-resistant and oxygen-resistant; and disposing an optical brightness enhancement layer over the quantum-dot layer.

In one embodiment, the optical brightness enhancement layer comprises a plurality of prisms.

In one embodiment, the present invention discloses a method for forming a quantum-dot film, comprising: performing a process on a plurality of quantum dots for enabling the plurality of quantum dots to be water-resistant and oxygen-resistant; forming a quantum-dot layer comprising a binder and the plurality of quantum dots dispersed in the binder, wherein the plurality of quantum dots are capable of being water-resistant and oxygen-resistant; and disposing a plurality of prisms layer over the quantum-dot layer.

In one embodiment, the plurality of prisms comprises a photo-curable material.

In one embodiment, the plurality of prisms comprises a thermally-curable material.

In one embodiment, the present invention discloses a quantum-dot composite film, comprising: a quantum-dot prism film, comprising a quantum-dot layer and a first plurality of prisms disposed over the quantum-dot layer; a first optical prism film, comprising a second plurality of prisms on a first side of the first optical prism film and a first adhesive layer disposed on the second side of the first optical prism film that is opposite to the first side of the first optical prism film; and a second optical prism film, comprising a third plurality of prisms on a first side of the second optical prism film and a second adhesive layer disposed on the second side of the second optical prism film that is opposite to the first side of the second optical prism film, wherein a top part of the first plurality of prisms is embedded in the first adhesive layer, and a top part of the second plurality of prisms is embedded in the second adhesive layer.

In one embodiment, the quantum-dot prism film comprises a first substrate and a second substrate, wherein the quantum-dot layer is disposed between the first substrate and the second substrate, wherein the first plurality of prisms are disposed on the first substrate.

In one embodiment, a thickness of the quantum-dot layer is in a range of 60-350 um.

In one embodiment, a thickness of the quantum-dot prism film is in a range of 70-380 um.

In one embodiment, a third adhesive layer is disposed on the quantum-dot layer, wherein the first plurality of prisms are adhered to the third adhesive layer.

In one embodiment, each of the first optical prism film and the second optical prism film is composed of a PET substrate, and the thickness of the PET substrate is between 25-188 um.

In one embodiment, a total thickness of the first optical prism film and the second optical prism film is in a range of 70 um-430 um.

In one embodiment, the present invention discloses a quantum-dot composite film, comprising: A quantum-dot composite film, comprising: a quantum-dot prism film, comprising a quantum-dot layer, a first substrate, and a second substrate, wherein the quantum-dot layer is disposed between the first substrate and the second substrate; a first optical prism film, comprising a first plurality of prisms on a first side of the first optical prism film and a first adhesive layer disposed on a second side of the first optical prism film that is opposite to the first side of the first optical prism film; and a second optical prism film, comprising a second plurality of prisms on a first side of the second optical prism film and a second adhesive layer disposed on a second side of the second optical prism film that is opposite to the first side of the second optical prism film, wherein a top surface of the first substrate is adhered to the first adhesive layer, and a top part of the first plurality of prisms is embedded in the second adhesive layer.

In one embodiment, the first optical prism film and the second optical prism film are formed as an optical composite prism film that has a total thickness in a range of 70 um-430 um.

In one embodiment, each of the first optical prism film and the second optical prism film is composed of a PET substrate, and the thickness of the PET substrate is between 25-188 um.

The detailed technology and above preferred embodiments implemented for the present invention are described in the following paragraphs accompanying the appended drawings for people skilled in this field to well appreciate the features of the claimed invention.

BRIEF DESCRIPTION OF THE DRAWINGS

The foregoing aspects and many of the accompanying advantages of this invention will become more readily appreciated as the same becomes better understood by reference to the following detailed description when taken in conjunction with the accompanying drawings, wherein.

DETAILED DESCRIPTION OF THE ILLUSTRATED EMBODIMENTS

The detailed explanation of the present invention is described as following. The described preferred embodiments are presented for purposes of illustrations and description and they are not intended to limit the scope of the present invention.

Figure 1:
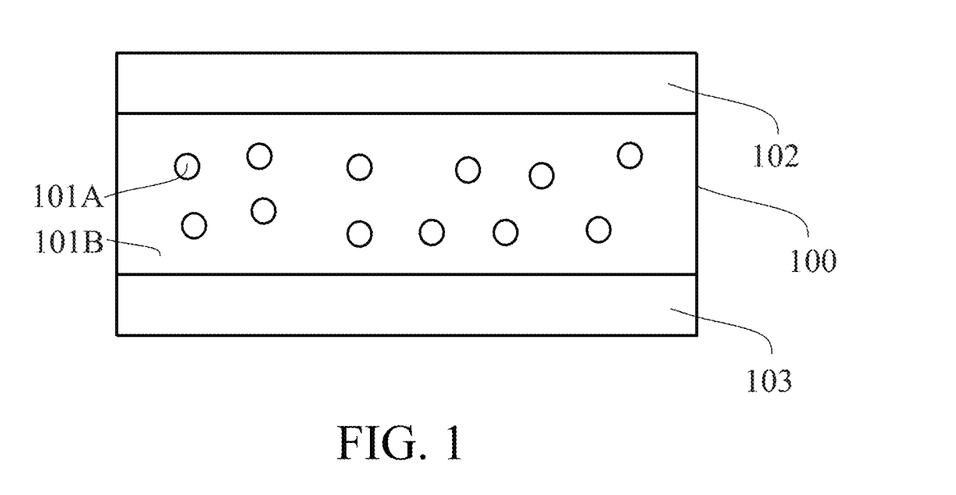
FIG. 1 illustrates a schematic cross-sectional view of a quantum-dot film.

FIG. 1 illustrates a schematic cross-sectional view of a quantum-dot composite film of the present invention, wherein a quantum-dot film 100 comprises a binder 101B and a plurality of quantum dots 101A dispersed in the binder 101B, wherein a first PET (polyethylene terephthalate) layer 102 and a second PET layer 103 are respectively disposed over a top and a bottom surface of the quantum-dot film 100.

Figure 2:
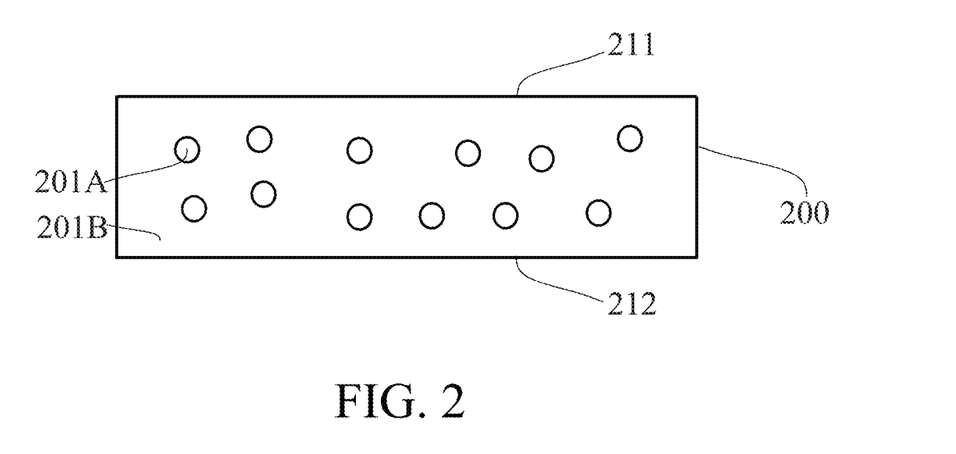
FIG. 2 illustrates a schematic cross-sectional view of a quantum-dot film in the present invention according to one embodiment of the present invention.

FIG. 2 illustrates a schematic cross-sectional view of the quantum-dot film 200 in the present invention. The quantum-dot film 200 comprises a binder 201B and a plurality of quantum dots 201A dispersed in the binder 201B. The thickness of the quantum-dot film 200 can be in the range from 25 μm to 350 μm.

The quantum dots 201A have a high stability when exposed to high temperature or heat, so the surface of the quantum dots 201A can be specially treated to improve the ability of resisting environmental damage caused by water and oxygen; therefore, the quantum dots 201A are capable of being water-resistant and oxygen-resistant enough without a barrier layer formed over/on each of the first major surface 211 and the second major surface 212 of the quantum-dot film 200.

The quantum-dot film 200 is capable of being supported by itself without a supporting layer formed over each of the first major surface 211 and the second major surface 212 of the quantum-dot film 200. Therefore, the material of the binder 201B of the quantum-dot film 200 should be selected such that the quantum-dot film 200 is capable of being supported by itself without a supporting layer formed over each of the first major surface 211 and the second major surface 212 of the quantum-dot film 200. In addition, the material of the binder 201B of the quantum-dot film 200 should be selected such that the quantum dots 201A in the quantum-dot film 200 is protected from damage caused by oxygen or water. The material of the binder 201B can include at least one of the following: PET (polyethylene terephthalate), PEN (polyethylene naphtholate), PAR (polyacrylate), PC (polycarbonates), and TAC (cellulose triacetate). Preferably, the material is PET (polyethylene terephthalate). The material can be pure PET (polyethylene terephthalate). The material of the binder 201B can be unitary or homogeneous.

The quantum dots 201A can comprise green quantum dots and red quantum dots. The material of the quantum dots 201A can comprise CdS, CdSe, CdTe, ZnSe, PbS, PbSe, InP, InAs, InGaP, ZnS, or ZnTe, but the present invention is not limited thereto. The material of the quantum dots 201A can comprise Cd (e.g., CdSe) or be Cd-free (e.g., InP). The concentration of the quantum dots 201A can be in the range from 0.1% to 20%, preferably, from 0.3 to 8%.

In one embodiment, wherein the concentration of the quantum dots in the quantum-dot film is 0.05-20%.

In one embodiment, wherein the concentration of the quantum dots in the quantum-dot film is 0.05-8%.

In one embodiment, the thickness of the quantum-dot film is 25-350 um.

Optionally, the quantum-dot film 200 can comprise a plurality of diffusing particles (not shown); the diffusing particles are further provided to increase the uniformity of the quantum dots 201A dispersed in the binder 201B. The material of the diffusing particles can be organic (e.g., PMMA (polymethyl methacrylate), PS (polystyrene), Melamine) or inorganic (e.g., silicon, $SiO_2$, $TiO_2$, $CaCO_3$, $Al_2O_3$, $ZrO_2$). The concentration of the diffusing particles can be in the range from 2% to 40%, preferably, from 5% to 15%.

Figure 3:
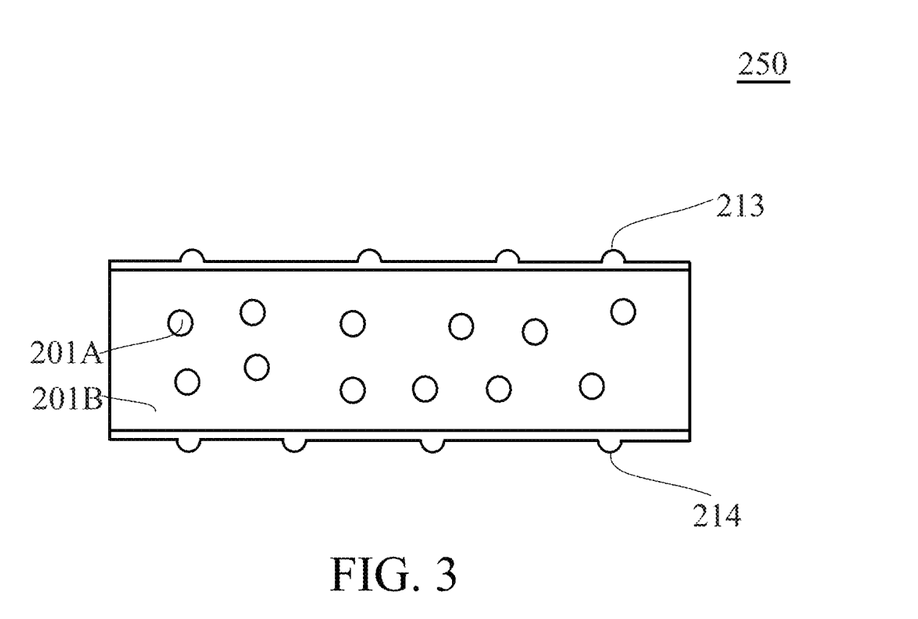
FIG. 3 illustrates a schematic cross-sectional view of the quantum-dot film in the present invention, wherein each of the first major surface and the second major surface of the quantum-dot layer is a structured surface according to one embodiment of the present invention.

Each of the first major surface 211 and the second major surface 212 of the quantum-dot film 200 can be a structured surface 213, 214 (see the quantum-dot film 250 in FIG. 3). The structured surface 213, 214 can be used for reducing the undesired photo phenomenon, such as Newton's rings. The matt structure can be used to forming each of the first major surface 211 and the second major surface 212 of the quantum-dot film 200.

The manufacturing method for forming the quantum-dot film 200 is described as follows.

The method for forming a quantum-dot film 200 comprises forming a quantum-dot film 200 comprising a binder 201B and a plurality of quantum dots 201A dispersed in the binder 201B. Forming the quantum-dot film 200 comprises performing a process on the quantum dots 201A and the material such that the plurality of quantum dots 201A is dispersed in the binder 201B. The process can be a co-extrusion process.

The material of the binder 201B can comprise a first portion and a second portion, wherein the quantum dots 201A and the first portion of the material are combined into a first component and the second portion of the material is formed into a second component, wherein the process is performed on the first component and the second component such that the quantum dots 201A are dispersed in the binder 201B. The process can be a co-extrusion process.

For the convenience of explanation, the material of the binder 201B is PET in Embodiment A1 of the invention; however, the present invention is not limited to this case. After the quantum dots, 201A are uniformly dispersed by a dispersion process, the quantum dots 201A and a first portion of PET can be combined into a first component (e.g., by the twin-screw extruder or the micro-twin screw extruder). The first component (i.e. QD in PET) can be in the form of a plurality of first chips. The first component may have a high concentration of the quantum dots 201A. The first component may have a better light-emitting effect and a better light-emitting uniformity. The second component can be made of pure PET or have a high concentration of PET. The second component (i.e. PET) can be in the form of a plurality of second chips (i.e. PET chips). The first component and the second component can be formed into the quantum-dot film 200 in the present invention based on a suitable mass ratio thereof (e.g., by the co-extrusion process).

The first component and the second component can be combined into a composite mixture (e.g., by the twin-screw extruder or the micro-twin screw extruder), wherein the process is performed on the composite mixture such that the quantum dots 201A are dispersed in the binder 201B. The composite mixture may have a better light-emitting effect and a better light-emitting uniformity. The process can be a co-extrusion process.

The material of the binder 201B can comprise a first portion, a second portion, and a third portion, wherein the quantum dots 201A and the first portion of the material are combined into a first component, the second portion of the material is formed into a second component, and the diffusing particles and the third portion of the material are combined into a third component, wherein the process is performed on the first component, the second component and the third component such that the quantum dots 201A are uniformly dispersed in the binder 201B. The process can be a co-extrusion process.

For the convenience of explanation, the material of the binder 201B is PET in Embodiment A2 of the invention; however, the present invention is not limited to this case. Compared to Embodiment A1 in which the first component and the second component are provided, Embodiment A2 further comprises a third component. After the diffusing particles are uniformly dispersed by a dispersion process, the diffusing particles and a third portion of PET can be combined into a third component (e.g., by the twin-screw extruder or the micro-twin screw extruder). The third component (i.e. diffusing particles in PET) can be in the form of a plurality of third chips. The third component may have a high concentration of the diffusing particles. The first component, the second component and the third component can be formed into the quantum-dot film 200 in the present invention based on a suitable mass ratio thereof (e.g., by the co-extrusion process).

The first component, the second component, and the third component are combined into a composite mixture (e.g., by the twin-screw extruder or the micro-twin screw extruder), wherein the process is performed on the composite mixture such that the quantum dots 201A are uniformly dispersed in the binder 201B. The composite mixture may have a better light-emitting effect and a better light-emitting uniformity. The process can be a co-extrusion process.

The quantum dots 201A can comprise green quantum dots and red quantum dots. The green quantum dots and a portion of PET can be combined into a first sub-component (e.g., by the twin-screw extruder or the micro-twin screw extruder). The red quantum dots and another portion of PET can be combined into a second sub-component (e.g., by the twin-screw extruder or the micro-twin screw extruder). The first sub-component and the second sub-component can be regarded as the first component in each of Embodiment A1 and Embodiment A2.

The process can be a co-extrusion process which is one of the stretch-forming technologies used for film-forming. The stretch-forming technology can be a bi-axially stretch-forming technology. The co-extrusion is a process in which two or more plastic materials, each of which has a property $X_i$, are extruded and combined to form a structure having a combination of the properties $X_1, X_2, \ldots X_N$ (N is integer and larger than 1) of the two or more plastic materials. When performing the co-extrusion process by using two plastic materials in Embodiment A1, one plastic material can be the first component and the other plastic material can be the second component. When performing the co-extrusion process by using three materials in Embodiment A2, one plastic material can be the first component, another material can be the second component and the other plastic material can be the third component.

For the convenience of explanation, the material of the binder 201B is PET and the material of the diffusing particles is PMMA in further described Embodiment A2 of the invention; however, the present invention is not limited to this case. Place PET chips in the oven and dry PET chips at 100° C. for 24 hours. Place PMMA beads in the oven and dry PMMA beads at 100° C. for 24 hours. Prepare the first mixture having the green quantum dots and the PET chips. The mass of the green quantum dots is 8 g and the mass of the PET chips is 72 g. Pre-uniform the first mixture and place the first mixture in the twin-screw extruder (or the micro-twin screw extruder, or the micro-extruder). Perform a heat dispersion (or nano-dispersion) process on the first mixture at 280° C. in the twin-screw extruder (by the high shear force) for 10 minutes to form the first sub-component (i.e. GQD in PET). The first sub-component may have a high concentration of the green quantum dots. Prepare the second mixture having the red quantum dots and the PET chips. The mass of the red quantum dots is 20 g and the mass of the PET chips is 72 g. Pre-uniform the second mixture and place the second mixture in the twin-screw extruder (or the micro-twin-screw extruder, or the micro-extruder). Perform a heat dispersion (or nano-dispersion) process on the second mixture at 280° C. in the twin-screw extruder (by the high shear force) for 10 minutes to form the second sub-component (i.e. RQD in PET). The second sub-component may have a high concentration of the red quantum dots. The first sub-component and the second sub-component can be regarded as the first component in Embodiment A2. Prepare the third mixture having the PMMA beads and the PET chips. The mass of the PMMA beads is 32 g and the mass of the PET chips is 48 g. Pre-uniform the third mixture and place the third mixture in the twin-screw extruder (or the micro-twin-screw extruder, or the micro-extruder). Perform a heat dispersion (or nano-dispersion) process on the third mixture at 280° C. in the twin-screw extruder (by the high shear force) for 10 minutes to form the third component (i.e. PMMA in PET). Prepare the fourth mixture having the first sub-component (i.e. GQD in PET), the second sub-component (i.e. RQD in PET), the third component (i.e. PMMA in PET), and the second component (i.e. PET chips). The mass of the first sub-component is 13 g, the mass of the second sub-component is 6 g, the mass of the third component is 16 g and the second component is 30 g. Place the fourth mixture in the twin-screw extruder (or the micro-twin-screw extruder, or the micro-extruder). Perform a heat dispersion (or nano-dispersion) process on the fourth mixture at 280° C. in the twin-screw extruder (by the high shear force) for 10 minutes to form the composite mixture. Finally, the composite mixture is formed into a quantum-dot film 200 (by the hot plate).

In one embodiment, the plurality of quantum dots are dispersed into the spaces between particles of the PET by a micro-twin-screw extruder nano-dispersion processing technology.

In one embodiment, a PET co-extrusion and biaxial stretching technology is used to form a PET quantum-dot optical film. The PET quantum-dot optical film does not need to have an additional gas barrier film (gas barrier film) and can still achieve the same anti-environmental test level.

Figure 4:
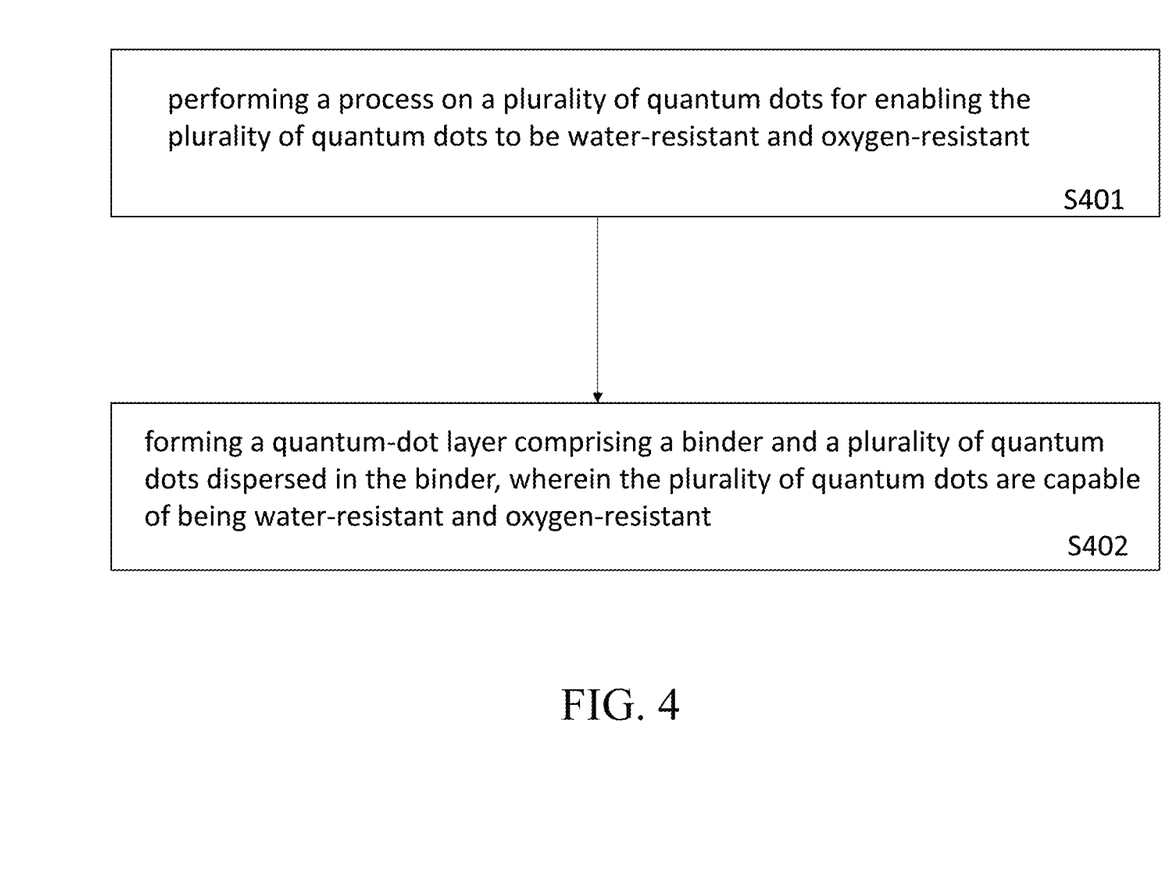
FIG. 4 illustrates a method for forming a quantum-dot film according to one embodiment of the present invention.

FIG. 4 illustrates a method for forming a quantum-dot film, in step S401: performing a process on the plurality of quantum dots for enabling the plurality of quantum dots to be water-resistant and oxygen-resistant; and in step S402: forming a quantum-dot layer comprising a binder and a plurality of quantum dots dispersed in the binder, wherein the plurality of quantum dots are capable of being water-resistant and oxygen-resistant.

Figure 5A:
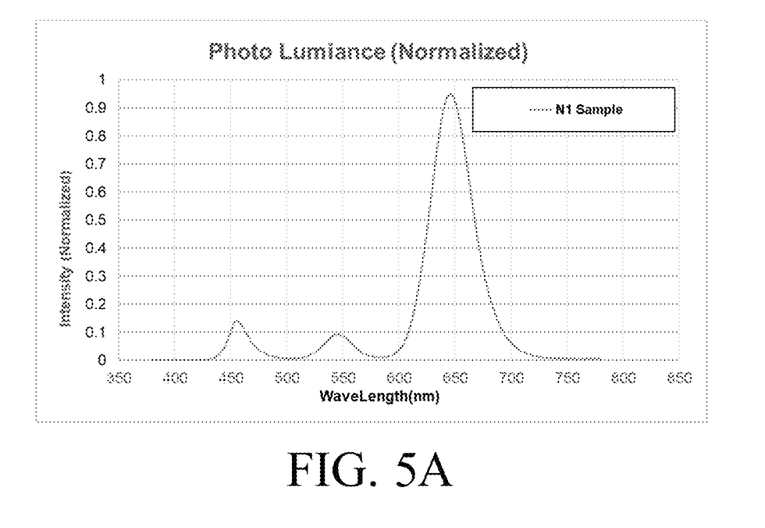
FIG. 5A illustrates the photo-luminance performance of the quantum-dot film in the present invention.
Figure 5B:
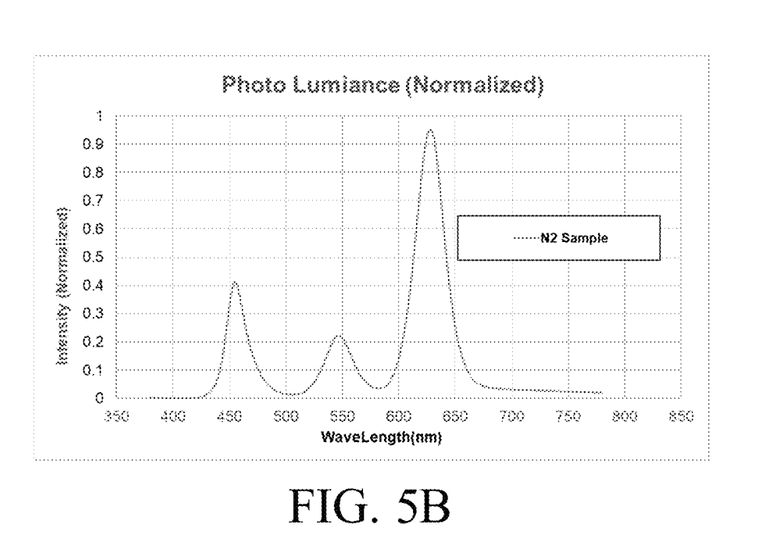
FIG. 5B illustrates the photo-luminance performance of the quantum-dot film in the present invention.

FIGS. 5A to 5B illustrates the photo-luminance performance of the quantum-dot film 200 in the present invention. Table 1 (shown below) illustrates one of the comparisons between quantum-dot film 100 in the prior art (see FIG. 1) and quantum-dot film 200 of the present invention (please see FIG. 2).

rier layer formed over/on each of the first major surface 211 and the second major surface 212 of the quantum-dot film 200.

In one embodiment, the plurality of prisms comprises a photo-curable material.

In one embodiment, the plurality of prisms comprises a thermally-curable material.

In one embodiment, the quantum-dot layer further comprises a plurality of diffusing particles.

In one embodiment, a quantum dot comprises Cd.

In one embodiment, wherein the concentration of the quantum dots in the quantum-dot layer is 0.05-20%.

In one embodiment, wherein the concentration of the quantum dots in the quantum-dot layer is 0.05-8%.

In one embodiment, the binder comprises at least one of the following: PET (polyethylene terephthalate), PEN (polyethylene naphtholate), PAR (polyacrylate), PC (polycarbonates), and TAC (cellulose triacetate).

In one embodiment, an adhesive layer is disposed on the quantum-dot layer, wherein the plurality of prisms that are adhered to the adhesive layer.

In one embodiment, a quantum-dot composite film is disclosed, wherein the quantum-dot composite film comprises: a plurality of quantum dots dispersed in the optical film, wherein the plurality of quantum dots are capable of being water-resistant and oxygen-resistant; and an optical brightness enhancement layer, disposed over the quantum-dot layer.

Figure 7A:
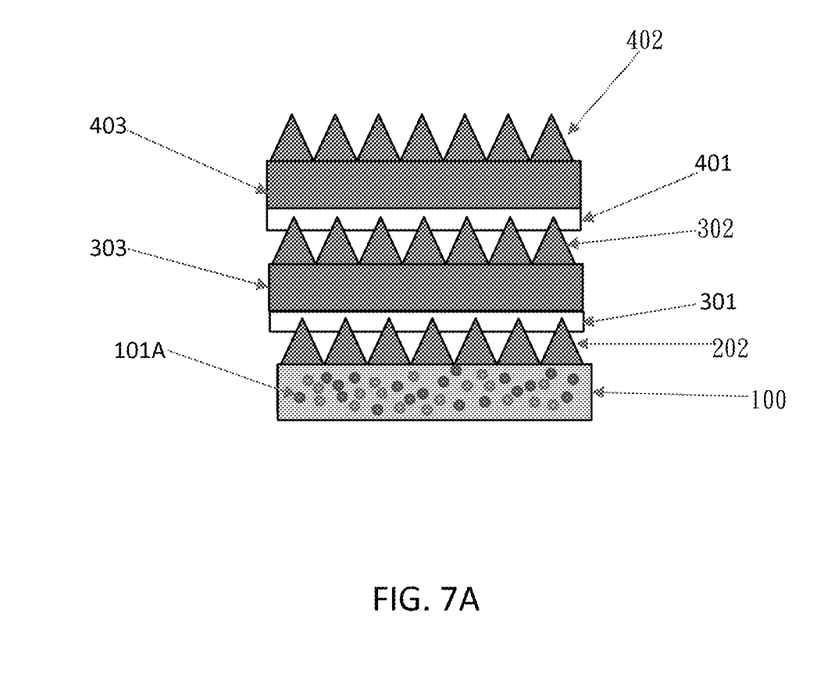
FIG. 7A illustrates a schematic cross-sectional view of a quantum-dot composite film according to one embodiment of the present invention.

FIG. 7A illustrates a schematic cross-sectional view of a quantum-dot composite film in the present invention, wherein the quantum-dot composite film comprises: a quan-

TABLE 1

|  | Blue | Green Light | | Red Light | | | | |
| --- | --- | --- | --- | --- | --- | --- | --- | --- |
|  | Light Intensity | Intensity | Wavelength (nm) | Intensity | Wavelength (nm) | L | x | y |
| the quantum-dot film 100 in the prior art (see FIG. 1) | 100.00% | 100.00% | 528 | 100.00% | 626 | 100% | 0.2332 | 0.2065 |
| the quantum-dot film 200 in the present invention (see FIG. 2) | 83.41% | 70.32% | 546 | 118.58% | 628 | 81.21% | 0.271 | 0.1967 |

Figure 6A:
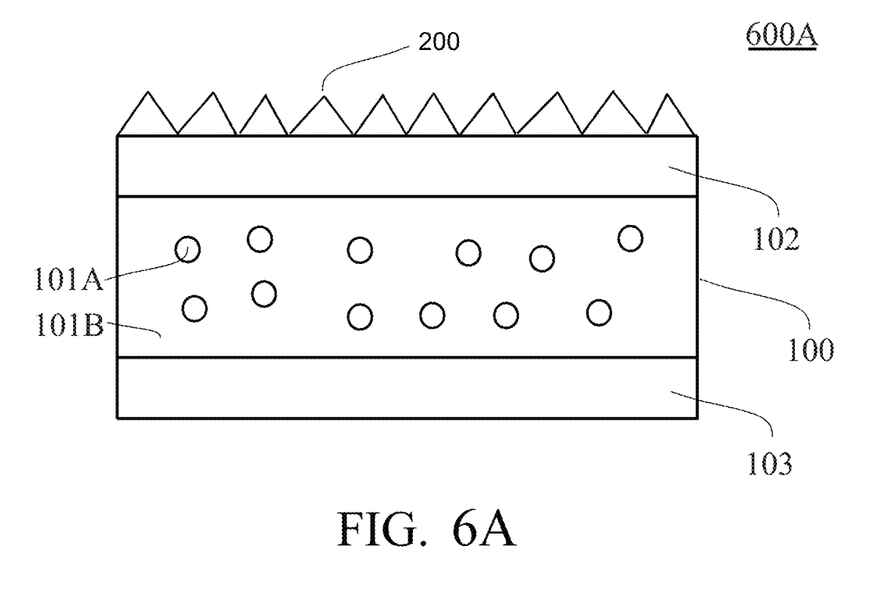
FIG. 6A illustrates a schematic cross-sectional view of a quantum-dot composite film according to one embodiment of the present invention.

FIG. 6A illustrates a schematic cross-sectional view of a quantum-dot composite film 600A in the present invention, wherein a quantum-dot film 100 comprises a binder 101B and a plurality of quantum dots 101A dispersed in the binder 101B, wherein a first PET 102 and a PET layer 103 are respectively disposed over a top and a bottom surface of the quantum-dot film 100, wherein a plurality of prisms 200 are disposed over the PET 102 or the PET 103.

Figure 6B:
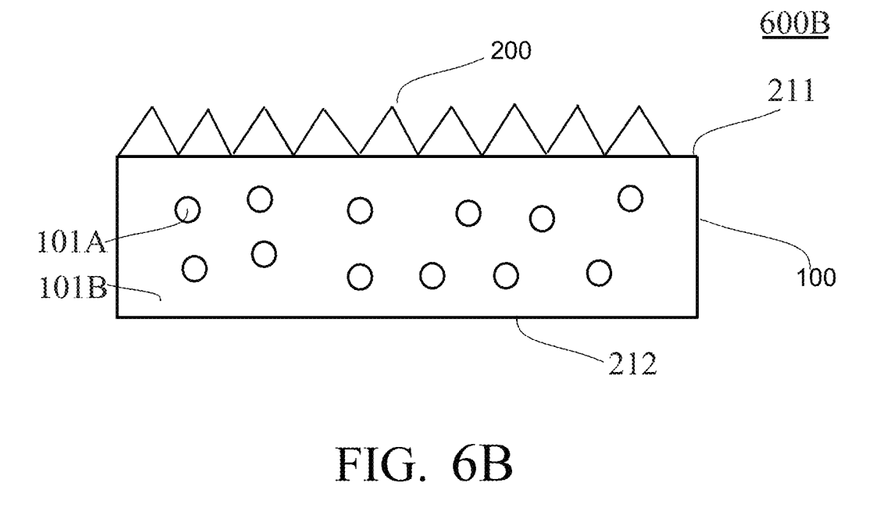
FIG. 6B illustrates a schematic cross-sectional view of a quantum-dot composite film according to one embodiment of the present invention.

FIG. 6B illustrates a schematic cross-sectional view of a quantum-dot composite film 600B in the present invention, wherein the quantum-dot film 100 comprises a binder 201B and a plurality of quantum dots 101A dispersed in the binder 101B. The thickness of the quantum-dot film 100 can be in the range from 25 μm to 350 μm, wherein a plurality of prisms 200 are disposed over the quantum-dot film 100.

The quantum dots 201A have high stability when exposed to high temperature or heat, so the surface of the quantum dots 201A can be specially treated to improve the ability of resisting environmental damage caused by water and oxygen; therefore, the quantum dots 201A are capable of being water-resistant and oxygen-resistant enough without a bartum-dot prism film comprising a quantum-dot layer 101 and a first plurality of prisms 202 that are disposed over the quantum dot film 100; an optical composite prism film, disposed over the quantum-dot prism film and comprising a first optical prism film and a second optical prism film, wherein the first optical prism film comprises a second plurality of films 302 on a first side of the first optical prism film and a first adhesive layer 301 disposed on the second side opposite to first side of the first optical prism film; and the second optical prism film comprises a third plurality of films 402 on a first side of the second optical prism film and a second adhesive layer 401 disposed on the second side of the second optical prism film that is opposite to the first side of the second optical prism film, wherein a top part of the first plurality of prisms 202 is embedded in the first adhesive layer 301 for mutual bonding, and a top part of the second plurality of prisms 302 is embedded in the second adhesive layer 401 for mutual bonding.

In one embodiment, the quantum dot film comprises a binder and a plurality of quantum dots 101A dispersed in the binder, wherein the plurality of quantum dots 101A are capable of being water-resistant and oxygen-resistant.

Figure 7B:
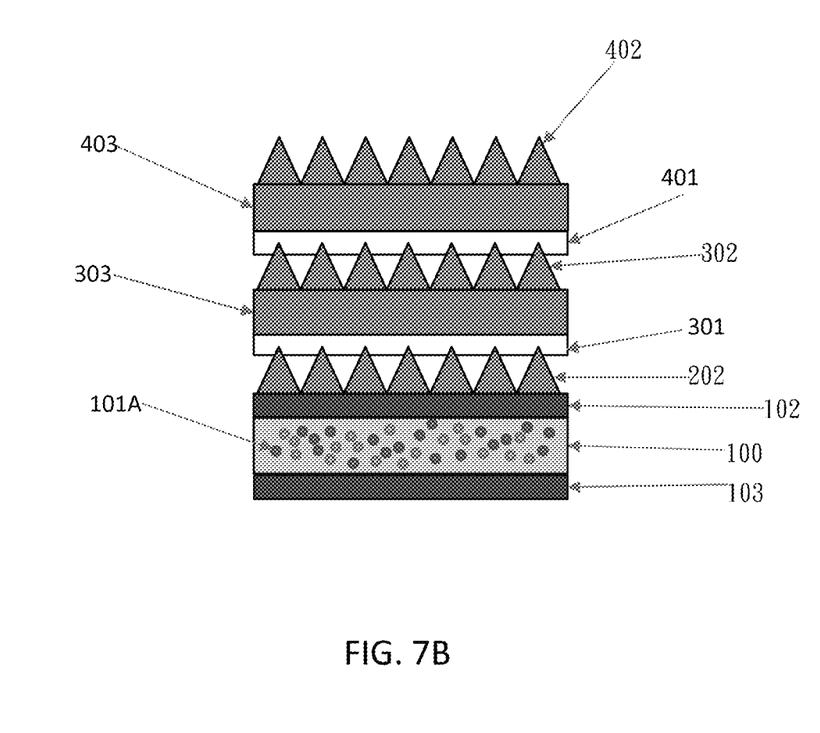
FIG. 7B illustrates a schematic cross-sectional view of a quantum-dot composite film according to one embodiment of the present invention.

In one embodiment, as shown in FIG. 7B, wherein the quantum-dot layer 101 is disposed between the first substrate 102 and the second substrate 103, wherein the first plurality of prisms 202 are disposed on the first substrate 102.

In one embodiment, as shown in FIG. 7B, the first optical prism film comprises a third substrate 303, wherein the second plurality of prisms 302 are disposed on the third substrate 303.

In one embodiment, the third substrate 303 and the second plurality of prisms 302 are integrated formed.

In one embodiment, as shown in FIG. 7B, the third substrate 303 is made of PET, and the thickness of the third substrate 303 is between 25-188 um.

In one embodiment, as shown in FIG. 7B, the second optical prism film comprises a fourth substrate 403, wherein the third plurality of prisms 402 are disposed on the fourth substrate 403.

In one embodiment, the fourth substrate 403 and the third plurality of prisms 402 are integrated formed.

In one embodiment, as shown in FIG. 7B, the fourth substrate 403 is made of PET, and the thickness of the fourth substrate 403 is between 25-188 um.

In one embodiment, the quantum-dot composite film has higher brightness than a single quantum dot film, and its brightness value is at least twice the brightness of a single quantum dot film.

In one embodiment, the quantum-dot composite film is used in a backlight module.

In one embodiment, a gap between every two adjacent prisms of the first optical prism film is between 12-50 um, and a gap between every two adjacent prisms of the second optical prism film is between 29-58 um.

In one embodiment, a gap between every two adjacent prisms of the quantum-dot prism film is between 20-60 um; a gap between every two adjacent prisms of the first optical prism film is between 12-50 um; and a gap between every two adjacent prisms of the second optical prism film is between 29-58 um.

In one embodiment, the first optical prism film is composed of a PET substrate, and its thickness is between 25-188 um.

In one embodiment, the second optical prism film is composed of a PET substrate, and its thickness is between 25-188 um.

In one embodiment, the total thickness of the optical composite prism film is between 70 um and 430 um.

In one embodiment, the quantum-dot layer 101 comprises a plurality of quantum dots with a pitch of between 20-60 um, and the thickness of the quantum-dot layer 101 is between 60-350 um.

In one embodiment, the total thickness of the quantum-dot prism film is between 70-380 u.

Figure 7C:
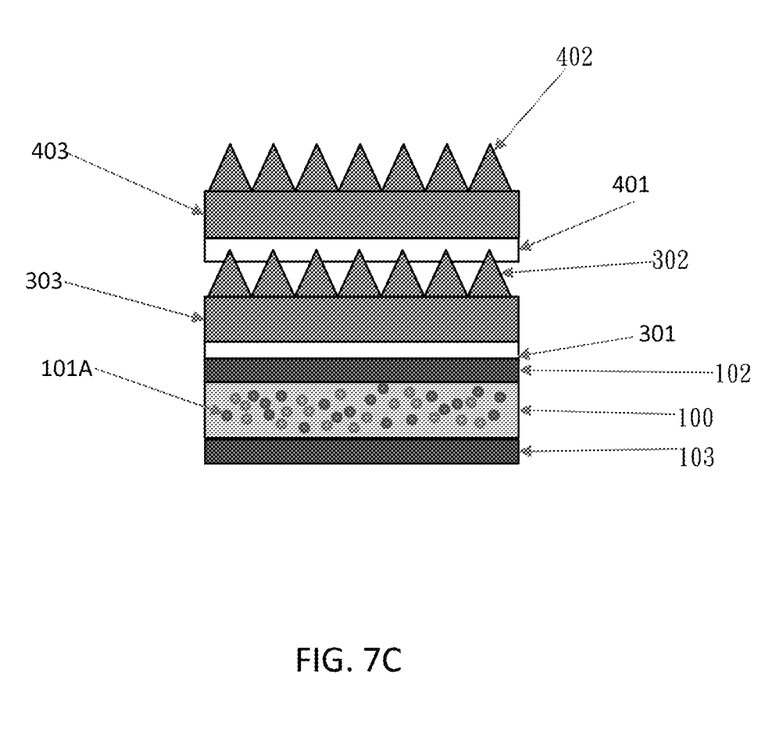
FIG. 7C illustrates a schematic cross-sectional view of a quantum-dot composite film according to one embodiment of the present invention.

FIG. 7C illustrates a schematic cross-sectional view of a quantum-dot composite film in the present invention, wherein the quantum-dot composite film comprises: a quantum-dot film comprising a quantum-dot layer 101, a first substrate 102, a second substrate 103, wherein the quantum-dot layer 101 is disposed between the first substrate 102 and the second substrate 103; an optical composite prism film, disposed over the quantum-dot film and comprising a first optical prism film and a second optical prism film, wherein the first optical prism film comprises a second plurality of films 302 on a first side of the first optical prism film and a first adhesive layer 301 disposed on the second side opposite to first side of the first optical prism film; and the second optical prism film comprises a third plurality of films 402 on a first side of the second optical prism film and a second adhesive layer 401 disposed on the second side of the second optical prism film that is opposite to the first side of the second optical prism film, wherein a top surface of the first substrate 102 is adhered to the first adhesive layer 301 for mutual bonding, and a top part of the second plurality of prisms 302 is embedded in the second adhesive layer 401 for mutual bonding.

In one embodiment, the quantum dot film comprises a binder and a plurality of quantum dots 101A dispersed in the binder, wherein the plurality of quantum dots 101A are capable of being water-resistant and oxygen-resistant.

In one embodiment, as shown in FIG. 7C, the first optical prism film comprises a third substrate 303, wherein the second plurality of prisms 302 are disposed on the third substrate 303.

In one embodiment, the third substrate 303 and the second plurality of prisms 302 are integrated formed.

In one embodiment, as shown in FIG. 7C, the third substrate 303 is made of PET, and the thickness of the third substrate 303 is between 25-188 um.

In one embodiment, as shown in FIG. 7C, the second optical prism film comprises a fourth substrate 403, wherein the third plurality of prisms 402 are disposed on the fourth substrate 403.

In one embodiment, the fourth substrate 403 and the third plurality of prisms 402 are integrated formed.

In one embodiment, as shown in FIG. 7C, the fourth substrate 403 is made of PET, and the thickness of the fourth substrate 403 is between 25-188 um.

In one embodiment, the quantum-dot composite film has higher brightness than a single quantum dot film, and its brightness value is at least twice the brightness of a single quantum dot film.

In one embodiment, the quantum-dot composite film is used in a backlight module.

In one embodiment, a gap between every two adjacent prisms of the first optical prism film is between 12-50 um, and a gap between every two adjacent prisms of the second optical prism film is between 29-58 um.

In one embodiment, the first optical prism film is composed of a PET substrate, and its thickness is between 25-188 um.

In one embodiment, the second optical prism film is composed of a PET substrate, and its thickness is between 25-188 um.

In one embodiment, the total thickness of the optical composite prism film is between 70 um and 430 um.

In one embodiment, the quantum-dot layer 101 comprises a plurality of quantum dots with a pitch of between 20-60 um, and the thickness of the quantum-dot layer 101 is between 60-350 um.

In one embodiment, the total thickness of the quantum-dot film is between 70-380 u.

Figure 7D:
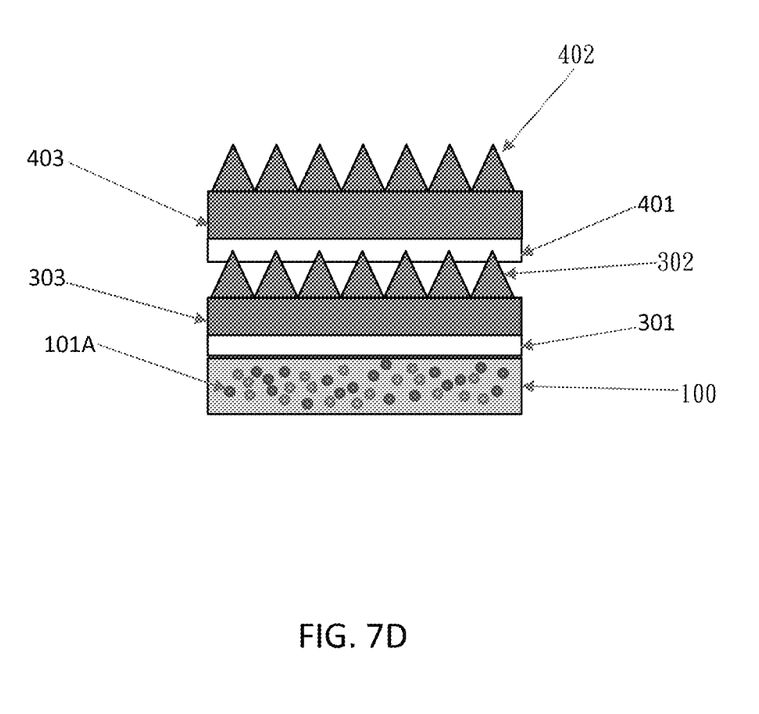
FIG. 7D illustrates a schematic cross-sectional view of a quantum-dot composite film according to one embodiment of the present invention.

FIG. 7D illustrates a schematic cross-sectional view of a quantum-dot composite film in the present invention, wherein the quantum-dot composite film comprises: a quantum-dot film comprising a quantum-dot layer 101; an optical composite prism film, disposed over the quantum-dot film and comprising a first optical prism film and a second optical prism film, wherein the first optical prism film comprises a second plurality of films 302 on a first side of the first optical prism film and a first adhesive layer 301 disposed on the second side opposite to first side of the first optical prism film; and the second optical prism film comprises a third plurality of films 402 on a first side of the second optical prism film and a second adhesive layer 401 disposed on the second side of the second optical prism film that is opposite to the first side of the second optical prism film, wherein a top surface of quantum-dot film is adhered to the first adhesive layer 301 for mutual bonding, and a top part of the second plurality of prisms 302 is embedded in the second adhesive layer 401 for mutual bonding.

In one embodiment, the quantum dot film comprises a binder and a plurality of quantum dots 101A dispersed in the binder, wherein the plurality of quantum dots 101A are capable of being water-resistant and oxygen-resistant.

In one embodiment, as shown in FIG. 7D, the first optical prism film comprises a third substrate 303, wherein the second plurality of prisms 302 are disposed on the third substrate 303.

In one embodiment, the third substrate 303 and the second plurality of prisms 302 are integrated formed.

In one embodiment, as shown in FIG. 7D, the third substrate 303 is made of PET, and the thickness of the third substrate 303 is between 25-188 um.

In one embodiment, as shown in FIG. 7D, the second optical prism film comprises a fourth substrate 403, wherein the third plurality of prisms 402 are disposed on the fourth substrate 403.

In one embodiment, the fourth substrate 403 and the third plurality of prisms 402 are integrated formed.

In one embodiment, as shown in FIG. 7D, the fourth substrate 403 is made of PET, and the thickness of the fourth substrate 403 is between 25-188 um.

In one embodiment, the quantum-dot composite film has higher brightness than a single quantum dot film, and its brightness value is at least twice the brightness of a single quantum dot film.

In one embodiment, the quantum-dot composite film is used in a backlight module.

In one embodiment, a gap between every two adjacent prisms of the first optical prism film is between 12-50 um, and a gap between every two adjacent prisms of the second optical prism film is between 29-58 um.

In one embodiment, the first optical prism film is composed of a PET substrate, and its thickness is between 25-188 um.

In one embodiment, the second optical prism film is composed of a PET substrate, and its thickness is between 25-188 um.

In one embodiment, the total thickness of the optical composite prism film is between 70 um and 430 um.

In one embodiment, the quantum-dot layer 101 comprises a plurality of quantum dots with a pitch of between 20-60 um, and the thickness of the quantum-dot layer 101 is between 60-350 um.

In one embodiment, the total thickness of the quantum-dot film is between 70-380 u.

Figure 8:
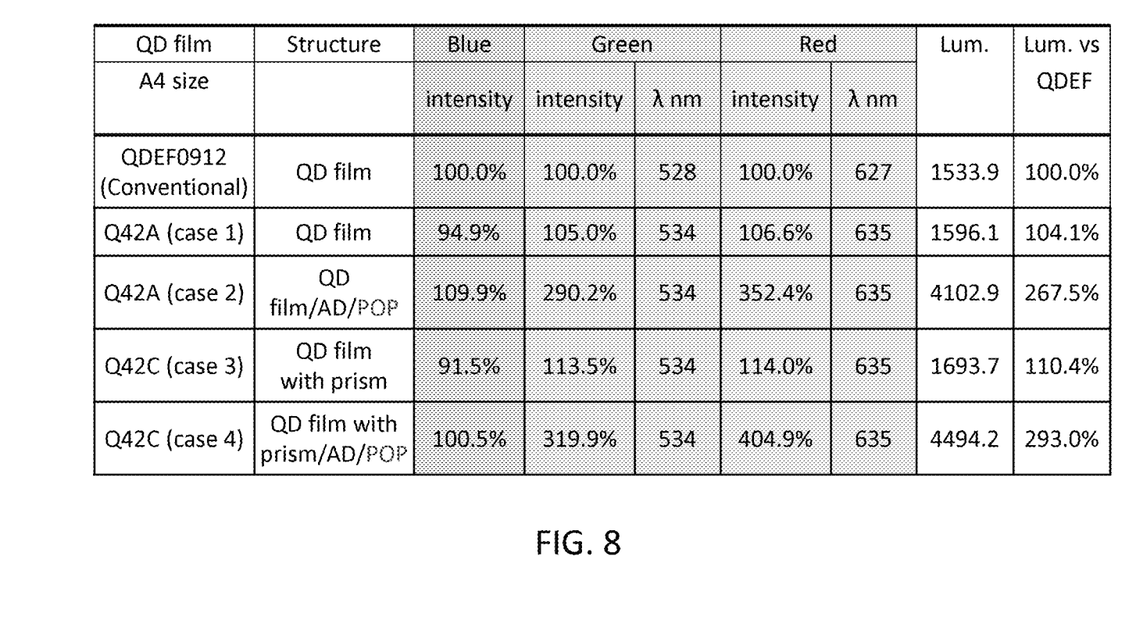
FIG. 8 illustrates the luminance performance of the quantum-dot composite film compared with the quantum-dot film.

FIG. 8 illustrates the luminance performance of the quantum-dot composite film compared with the quantum-dot film 100 only, wherein the luminance of the quantum-dot composite film is at least twice the luminance of the quantum-dot film 100. As shown in FIG. 8, the case 4 corresponding FIG. 7A and FIG. 7B has the luminance 293.0% compared with the luminance 100.0% of the conventional QD film, and the case 2 corresponding to FIG. 7C has the luminance 267.5% compared with the luminance 100.0% of the conventional QD film.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A quantum-dot composite film, comprising:
    a quantum-dot prism film, comprising a quantum-dot layer and a first plurality of prisms disposed over the quantum-dot layer;
    a first optical prism film, comprising a second plurality of prisms on a first side of the first optical prism film and a first adhesive layer disposed on a second side of the first optical prism film that is opposite to the first side of the first optical prism film; and
    a second optical prism film, comprising a third plurality of prisms on a first side of the second optical prism film and a second adhesive layer disposed on a second side of the second optical prism film that is opposite to the first side of the second optical prism film, wherein a top part of the first plurality of prisms is embedded in the first adhesive layer, and a top part of the second plurality of prisms is embedded in the second adhesive layer, wherein a gap between every two adjacent prisms of the quantum-dot prism film is between 20-60 um; a gap between every two adjacent prisms of the first optical prism film is between 12-50 um; and a gap between every two adjacent prisms of the second optical prism film is between 29-58 um.

2. The quantum-dot composite film according to claim 1, wherein the quantum-dot prism film comprises a first substrate and a second substrate, wherein the quantum-dot layer is disposed between the first substrate and the second substrate, and the first plurality of prisms are disposed on the first substrate.

3. The quantum-dot composite film according to claim 1, wherein a thickness of the quantum-dot layer is in a range of 60-350 um.

4. The quantum-dot composite film according to claim 1, wherein a thickness of the quantum-dot prism film is in a range of 70-380 um.

5. The quantum-dot composite film according to claim 1, wherein a third adhesive layer is disposed on the quantum-dot layer, wherein the first plurality of prisms are adhered to the third adhesive layer.

6. The quantum-dot composite film according to claim 1, wherein each of the first optical prism film and the second optical prism film is composed of a PET substrate, and the thickness of the PET substrate is between 25-188 um.

7. The quantum-dot composite film according to claim 1, wherein the first optical prism film and the second optical prism film are formed as an optical composite prism film that has a total thickness in a range of 70 um-430 um.

8. The quantum-dot composite film according to claim 1, wherein the quantum-dot layer comprises a plurality of quantum dots and a plurality of diffusing particles.

9. The quantum-dot composite film according to claim 8, wherein the plurality of quantum dots are capable of being water-resistant and oxygen-resistant.

10. A quantum-dot composite film, comprising:
    a quantum-dot prism film, comprising a quantum-dot layer, a first substrate, a second substrate, and a first plurality of prisms, wherein the quantum-dot layer is disposed between the first substrate and the second substrate, and the first plurality of prisms are disposed on the first substrate;
    a first optical prism film, comprising a second plurality of prisms on a first side of the first optical prism film and a first adhesive layer disposed on a second side of the first optical prism film that is opposite to the first side of the first optical prism film; and a second optical prism film, comprising a third plurality of prisms on a first side of the second optical prism film and a second adhesive layer disposed on a second side of the second optical prism film that is opposite to the first side of the second optical prism film, wherein a top part of the first plurality of prisms is embedded in the first adhesive layer, and a top part of the second plurality of prisms is embedded in the second adhesive layer, wherein a gap between every two adjacent prisms of the quantum-dot prism film is between 20-60 um; a gap between every two adjacent prisms of the first optical prism film is between 12-50 um; and a gap between every two adjacent prisms of the second optical prism film is between 29-58 um.

11. The quantum-dot composite film according to claim 10, wherein a thickness of the quantum-dot layer is in a range of 60-350 um.

12. The quantum-dot composite film according to claim 10, wherein a thickness of the quantum-dot prism film is in a range of 70-380 um.

13. The quantum-dot composite film according to claim 10, wherein a third adhesive layer is disposed on the quantum-dot layer, wherein the first plurality of prisms are adhered to the third adhesive layer.

14. The quantum-dot composite film according to claim 10, wherein each of the first optical prism film and the second optical prism film is composed of a PET substrate, and the thickness of the PET substrate is between 25-188 um.

15. The quantum-dot composite film according to claim 10, wherein the first optical prism film and the second optical prism film are formed as an optical composite prism film that has a total thickness in a range of 70 um-430 um.

* * * * *